United States Patent
Eickhoff

(10) Patent No.: US 9,005,572 B2
(45) Date of Patent: Apr. 14, 2015

(54) HYDROGEN GENERATOR

(75) Inventor: Steven J. Eickhoff, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 1219 days.

(21) Appl. No.: 12/903,901

(22) Filed: Oct. 13, 2010

(65) Prior Publication Data

US 2011/0142751 A1 Jun. 16, 2011

Related U.S. Application Data

(60) Provisional application No. 61/285,479, filed on Dec. 10, 2009.

(51) Int. Cl.
| | | |
|---|---|---|
| C01B 3/10 | (2006.01) | |
| B01J 8/06 | (2006.01) | |
| B01J 7/02 | (2006.01) | |
| B01J 8/00 | (2006.01) | |
| B01J 8/02 | (2006.01) | |
| C01B 3/06 | (2006.01) | |
| C01B 3/08 | (2006.01) | |

(52) U.S. Cl.
CPC .. *B01J 7/02* (2013.01); *B01J 8/009* (2013.01); *B01J 8/0242* (2013.01); *C01B 3/06* (2013.01); *C01B 3/065* (2013.01); *C01B 3/08* (2013.01); *C01B 2203/066* (2013.01); *Y02E 60/362* (2013.01); *Y10S 420/90* (2013.01)

(58) Field of Classification Search
USPC .............. 423/657; 420/900; 425/355
See application file for complete search history.

(56) References Cited

U.S. PATENT DOCUMENTS

| 4,155,712 | A | 5/1979 | Taschek | |
|---|---|---|---|---|
| 8,535,845 | B2 * | 9/2013 | Rock et al. | 429/463 |
| 2003/0228252 | A1 * | 12/2003 | Shurtleff | 423/657 |
| 2007/0124989 | A1 | 6/2007 | Eickhoff et al. | |
| 2009/0113795 | A1 | 5/2009 | Eickhoff | |

FOREIGN PATENT DOCUMENTS

| EP | 1514839 A2 | 3/2005 |
|---|---|---|
| EP | 2108618 A2 | 10/2009 |
| EP | 2108618 A3 | 8/2010 |
| JP | 200589253 A | 4/2007 |
| JP | 2005089253 | 4/2007 |
| WO | WO-2005/019098 A1 | 3/2005 |

(Continued)

OTHER PUBLICATIONS

"European Patent Application No. 11170785.7, Office Action mailed Sep. 22, 2011", 6 pgs.
"International Search Report for Application No. 11170785.-2119", (Sep. 7, 2011), 5 pgs.
Moghaddam, Saeed, et al., "A self-regulating hydrogen generator for micro fuel cells", Journal of Power Source 185 (2008) 445-450, (2008), 445-450.

(Continued)

*Primary Examiner* — Stanley Silverman
*Assistant Examiner* — Syed Iqbal
(74) *Attorney, Agent, or Firm* — Schwegman Lundberg & Woessner, P.A.

(57) ABSTRACT

A device includes a chemical hydride fuel pellet having a plurality of holes extending from a first end to a second end. A plurality of tubes formed of water vapor permeable and hydrogen impermeable material extend from the first end to the second end through the tubes. A container has an inlet for water vapor containing gas coupled to the first end of the tubes and an outlet coupled to the second end of the tubes. A hydrogen outlet is coupled to the fuel pellet.

21 Claims, 12 Drawing Sheets

(56) References Cited

FOREIGN PATENT DOCUMENTS

| WO | WO-2005019098 A1 | 3/2005 |
| WO | WO-2006/091227 A1 | 8/2006 |
| WO | WO-2006091227 A1 | 8/2006 |
| WO | WO 2006111005 A1 * | 10/2006 |

OTHER PUBLICATIONS

"European Application Serial No. 11170785.7, Response filed Jan. 13, 2012 to Office Action mailed Sep. 22, 2011", 9 pgs.

* cited by examiner

HYDROGEN GENERATOR

RELATED APPLICATION

This application claims priority to U.S. Provisional Application Ser. No. 61/285,479 (entitled Hybrid Fuel Cell, filed Dec. 10, 2009) which is incorporated herein by reference.

BACKGROUND

Efficient energy storage and utilization faces many obstacles. Proton exchange membrane (PEM) fuel cells for man-portable power and micro air vehicles require lightweight, small-size, and high-rate hydrogen sources. Commercially available hydrogen sources such as metal hydrides, compressed hydrogen in cylinders, or catalytic waterborohydride hydrogen generators are capable of high rate hydrogen generation, but are heavy and bulky.

While some hydrogen generators are light-weight and have small size, they are incapable of generating hydrogen at a sufficiently high rate for many applications.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

A hybrid fuel cell power generator provides run time improvement and energy efficiency under specified load power profiles. Moreover, the hybrid fuel cell power generator may be substantially lighter than prior energy storage devices and may have lower projected lifecycle costs, without compromising operation temperature range or environmental and safety performance. A revolutionary improvement in runtime lies in the innovative fuel-cell technology and its fuel chemistry based on lithium aluminum hydride (LAH) that requires no net water consumption in order to sustain its operation, thus eliminating the need for a water fuel reservoir, which enables the energy source to be substantially smaller and lighter than other conventional chemical hydride or direct methanol fuel cells with on-board storage of water (fuel, diluent, or solvent).

Figure 1:
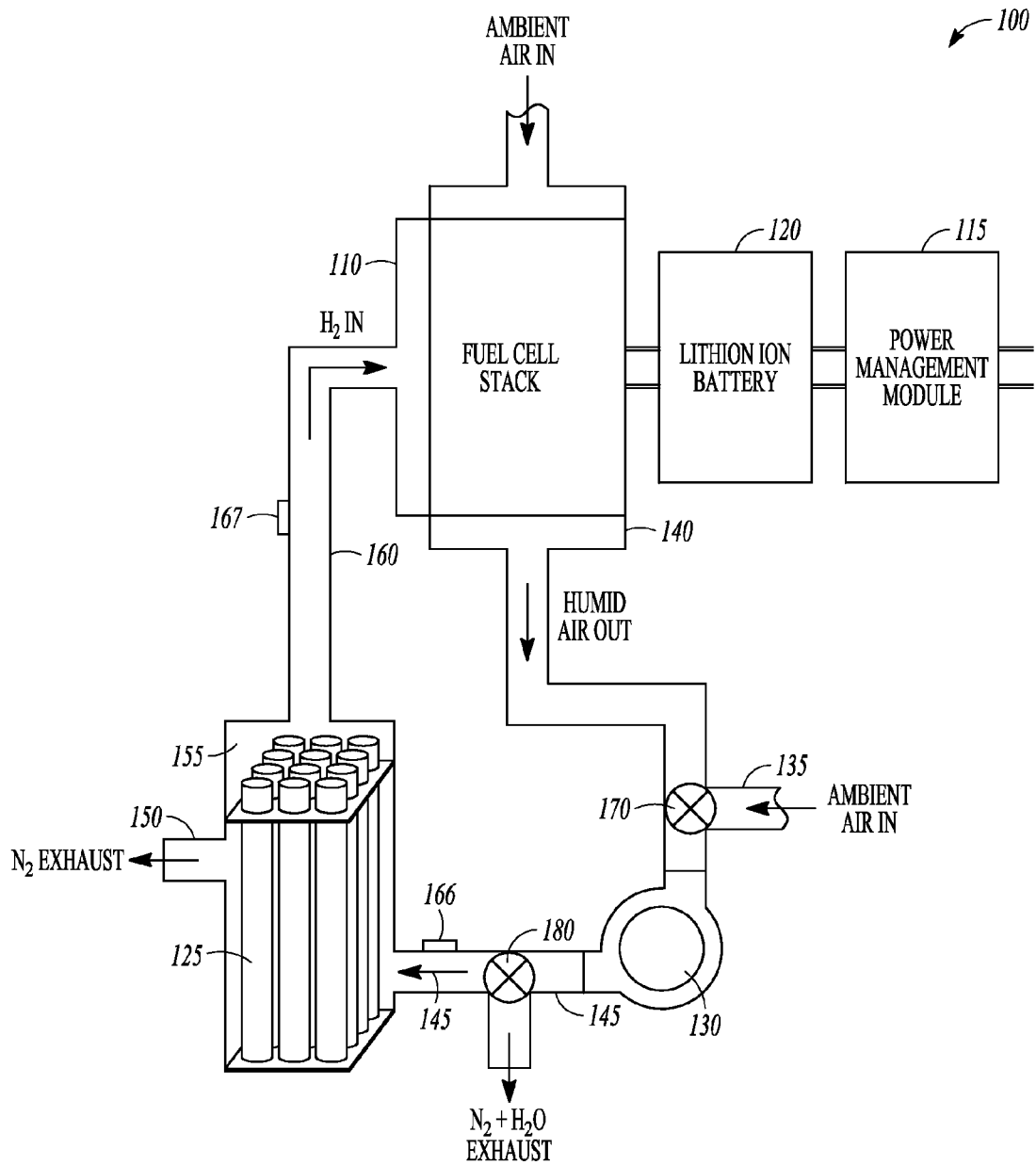
FIG. 1 is a schematic diagram of a power generator controlling airflow a fuel cell stack and hydrogen generator according to an example embodiment.

A hybrid fuel cell power generator is illustrated at 100 in schematic form in FIG. 1. In one embodiment power generator 100 is a hybridization between a fuel cell 110 that provides maximum energy-density, and power management circuitry 115 utilizing an ultra-high-power rechargeable battery 120, such as a Li-ion battery manufactured by Saft America Inc., that is capable of handling various load power profiles with significant transient fluctuations. Other rechargeable batteries may be used in further embodiments.

The hybrid fuel cell power generator 100 has a system configuration (implemented in a X590 form factor battery package in one embodiment) and operating principle are schematically depicted in FIG. 1. The hybrid fuel cell power generator system 100 includes a hydrogen generator 125. Hydrogen generator 125 in one embodiment is a replaceable and disposable "fuel-cartridge" unit that generates H2 for a H2/oxygen proton exchange membrane (PEM) fuel cell 110, and a permanent unit that in one embodiment includes (PEM) fuel cell 110, Li-ion recharge battery 120 as an output stage to interface with an external load, and the power management module 115 that controls electronic and fluidic control circuits (control valves and fan) to dynamically sense and optimize the power generator 100 under varying load and environmental conditions.

The hybrid fuel cell power generator 100 in various embodiment may include one or more of the following innovative aspects:

Hybridization between a fuel cell and Li-ion rechargeable batteries maximizes total energy and extraction efficiency to meet load power profiles with transients (up to 1200 W)

Ultra high power lithium-ion rechargeable batteries developed by Saft with 2× energy density of state-of-the-art (SOA) lithium-ion and peak power >1200 W, enabling >99% power management efficiency Water-less fuel cell operation scavenges water in vapor form from its cathode and uses it as fuel in the H2 generation process, enabling >5.3× runtime and 33% less weight of a BA5590 lithium battery:

High fuel energy density (>3100 Whr/liter) and specific energy (>3300 Whr/kg)

Broad environmental operating (−40 to 85° C.) and storage (−40 to 120° C.) range LAH-based fuel chemistry (water-vapor driven reaction), and engineered fuel formulation (particle size and porosity) enabling >95% fuel utilization at high power Carbon foam and metalized polymer film fuel cell stack composition enabling fast startup and transient response, compact size, and light weight, low internal/contact resistance Replaceable and disposable fuel-cartridge configuration enabling further enhanced runtime and weight advantages (7.1× runtime and 58% weight reduction in a volume equivalent to two BA5590 batteries) for extended mission duration and reduced life-cycle cost Hot-swappable fuel cartridges for uninterrupted power Ambient air serves as the hybrid fuel cell power generator 100 oxygen source, carrier gas for the water vapor fuel, and coolant gas for the fuel cell stack and H2 generator. A miniature fan 130 draws in fresh air from ambient via an inlet 135, circulates it over the fuel cell stack via an ambient air passage 140 and H2 generator via path 145, and exhausts to ambient at outlet 150. As the air passes through the fuel cell stack, oxygen is consumed by the fuel cell, and water vapor and waste heat are absorbed. This air (now primarily nitrogen and water vapor) travels to the H2 generator via passages 140 and 145 and passes over the surface of hydrogen producing fuel, which in one embodiment may include a bundle of fuel rods or a fuel with humid air passages in various embodiments.

The fuel rods in one embodiment consist of thin-wall sulfonated tetrafluoroethylene (STFE) polymer tubes with a porous LAH core. The STFE tubes are highly permeable to water vapor but relatively impermeable to other gases (O2, N2, H2, etc). The tubes may be cylindrical or partly conical in shape in some embodiments. The cross section of the tubes may also be polygonal in further embodiments. The LAH in the fuel rod core is highly reactive to water vapor and spontaneously generates H2 gas (and heat) upon exposure, creating a low humidity environment inside the fuel rod core. Water vapor in the air stream permeates the STFE tubes due to the large concentration gradient across the tube wall, and once inside the tube, reacts with LAH to generate H2. The H2 is trapped inside the STFE tubes and is collected and fed through a manifold 155 and passage 160 to an anode of the fuel cell stack 110, where it is consumed to generate electrical power, heat, and water.

As the air passes through the H2 generator, it also absorbs waste heat from the fuel rods before exhausting to ambient at outlet 150. The electrical power generated in the fuel cell stack may be fed to power management circuitry which conditions the power and provides it to the load. A suite of sensors, represented in various example positions at 166 and 167 monitor temperature, humidity, and pressure throughout the system 100. Data provided by the sensors, as well as the electrical load and charge state of the Li-ion rechargeable batteries 120 are used by the control electronics 115 to determine and set the fan 130 speed and control valve positions.

In one embodiment, an ambient air in control valve is located in passage 140 between the fuel cell 110 and the fan 130. Control valve 170 may be used to control addition of ambient air into the flow path via an inlet 175. A second control valve 180 may be located in passage 145 between the fan 130 and hydrogen generator 125 to vent excess gas and water vapor prior to it causing hydrogen generation.

Fuel consumption may also be monitored, and the remaining capacity may be displayed on the hybrid fuel cell power generator packaging in various embodiments. In one embodiment, greater than 95% fuel utilization may be achieved through optimized LAH fuel formation (porosity, particle size/distribution). The STFE tube composition, geometry, fuel rod packing configuration, and airflow control may be further optimized to achieve a H2 generation rate sufficient for 50 W in one embodiment. Further embodiments may provide from 10 W to more than 1000 W of power.

In some embodiments, the LAH-water reaction generates a substantial amount of heat (150 kJ/mol LAH, exothermic) leading to a rise in temperature in the fuel. The temperature may be monitored along with controlling airflow over the stack to maintain temp below 125° C. In other words, as the temperature rises, more air may be brought in via inlet 175 to cool the air provided to the fuel via passage 145. Similarly, less air may be added as the temperature of the fuel decreases.

$Li_2CO_3$ may form in the presence of atmospheric $CO_2$ if the local relative humidity is greater than 10-15%. $Li_2CO_3$ formation may be prevented by: 1) controlling the humidity in the fuel rods to <15% by setting fan speed and modulating valve positions such that water is exhausted at control valve 180, and 2) engineering the fuel formulation (particle size/distribution and porosity) to maintain a small humidity gradient in the fuel rods.

Electrochemical system power performance can substantially degrade at low temperatures (−40° C.) due to slower reaction kinetics and lower electrolyte conductivity. The hybrid fuel cell may avoid freezing problems by 1) using water in vapor form, 2) adjusting airflow to prevent water vapor condensation, and 3) using heat generated by the fuel cell stack and H2 generator to regulate the temperature of the fuel cell stack and fuel rods.

Fuel cells and other open (air breathing) systems like metal-air batteries face unique environmental challenges related to ambient humidity, unlike closed (sealed) systems (BA5590/BB2590) that operate essentially independent of ambient humidity. Open systems face flooding at high ambient humidity and dry out at low ambient humidity, both of which limit power output. Various embodiments of the hybrid fuel cell based generator utilize a variable speed fan and modulating valves to control the humidity throughout the system, ensuring that the fuel cell stack and H2 generator each have the optimum water concentration and flow rate.

Fuel cell stack: Fuel cell electrochemistry, heat and water generation, H2 and oxygen consumption, fluidic and thermal resistance in flow channels, current and potential (I-V), over temperature and humidity may be determined and control based on calculations or experiment in various embodiments.

Hydrogen generator: LAH-water vapor reaction chemistry, water vapor consumption and H2 generation, fluidic and thermal resistance in fuel rods and flow channels, water vapor permeability of STFE tubing, mass transfer (diffusion) resistance in fuel rod, reaction product expansion, fuel utilization, over temperature and humidity: The H2 generator's fuel utilization may be determined based on calculations or experiment in various embodiments.

Fluidic circuitry: Appropriate sizing of fan and control valves may be based on fluidic resistance of the fuel cell stack, H2 generator, and flow channels, power consumption of the fan and control valves, heat transfer in fluidic circuitry and effects on water vapor condensation and required flow over temperature and humidity. In one embodiment, the outlet of the H2 generator is sized consistent with the area of the fluid flow path through the H2 generator to ensure no further resistance to flow is created at the outlet. In further embodiments, the outlet may be sized based on further considerations.

Power consumption of the microcontroller and sensors, and efficiency of power management circuitry may also be taken into account. Capacity, charge/discharge rate, and efficiency of Li-ion rechargeable batteries may be adjusted based on the desired maximum power output of the generator.

In some embodiments, noryl plastic packaging consistent with the type used on the Saft BA5590 may be used. Many different types of plastics and other materials that provide low weight yet sufficient tolerance to the operating parameters and environmental conditions of the generator may be used. The projected fuel efficiency, runtime, and energy of various hybrid fuel cell (HFC) generators compared to the B A5590 and BB2590 are shown for each load profile in Table-1. Three different load profiles are illustrated for conditions consisting of 22° C. and 50% relative humidity of ambient air. In the #2 load profile the negative power pulse is not absorbed by BA5590.

portion of the power profile. The fuel efficiency of the hybrid fuel cell power generator 100 is greater than 91% for all load profiles, and is greater than 100% for the second load profile. Fuel efficiency in this context may be defined as the ratio of net electrical energy delivered to the load to theoretical energy in the LAH plus that in the Li-ion batteries. The theoretical energy in the chemical hydride fuel is defined as the energy available assuming complete (100%) stoichiometric conversion of LAH to H2 (i.e. 1 mol of LAH generates 4 mol of H2), and 50% H2-to-electrical conversion efficiency in the fuel cell (i.e. the fuel cell operates at ~0.6V/cell). This operating point is selected because the fuel cell stack is designed to operate at 0.6V/cell at a power level of 33 W. This definition allows for greater than 100% efficiency if the FC is operating at less that 33 W (i.e. the cell potential is >0.6 V/cell).

The mass, volume, energy, and power consumption of the components comprising the preliminary hybrid fuel cell power generator 100 system are shown in Table 2. LAH fuel cartridge comprises 59% and 54% of the system volume and mass, respectively, which determines a gross energy capacity (before efficiency and parasitic power) of 1233 Whr. The hybrid fuel cell power generator 100 is tightly integrated, with over 95% of the X590 volume occupied by system components. The design also allocates generous 110 cc and 85 cc (14% and 11% of the total volume) to "FC stack" and "fluidic

TABLE 1

| | | BA5590 | | BB2590 | | HFC | | | | |
|---|---|---|---|---|---|---|---|---|---|---|
| Load Profile | Avg Power (W) | Energy (Whr) | Run time (hrs) | Energy (Whr) | Run time (hrs) | Energy (Whr) | Run time (hrs) | Efficiency (%) | Run time (X) over BA5590 | Run time (X) over BB2590 |
| 1 | 33 | 204 | 6.2 | 211 | 6.4 | 1125 | 34.1 | 91.2 | 5.5 | 5.3 |
| 2 | 21.75 (38)* | 201 | 5.3 | 209 | 9.6 | 1256 | 57.8 | 102 | 11.0 | 6.0 |
| 3 | 31 | 207 | 6.7 | 213 | 6.9 | 1144 | 36.9 | 92.8 | 5.5 | 5.4 |

As shown in the right-most two columns of Table-1, the projected x590 hybrid fuel cell power generator 100 runtime advantages over that of BA5590 and B2590 are between 5.3× and 11×, providing a significant increase in available energy for the soldier. The larger 11× runtime advantage of hybrid fuel cell power generator 100 over BA5590 for load profile 2 results from the fact that BA5590 does not absorb the negative circuits", respectively. Obviously, any volume reduction (or increase) in the non-energy storing components can potentially translate into gain (or loss) in energy capacity or runtime. The "parasitic" power consumption for Load Profile 1 is 1.3 W, or 3.9% of the 33 W average power delivered to the load. It is similarly low for the other two load profiles.

TABLE 2

| Sub System | Mass (g) | % Mass | Volume (cc) | % Volume | Energy (Whr) | Power consumption (W) |
|---|---|---|---|---|---|---|
| Fuel Cell Stack | 38 | 5.7 | 100 | 11.9 | 0 | 0 |
| Power/control electronics | 15 | 2.3 | 18 | 2.1 | 0 | 0.26 |
| Li-ion rechargeable battery | 62 | 9.4 | 54 | 6.4 | 19 | 0 |
| Fluidic circuitry | 64 | 9.7 | 85 | 10.1 | 0 | 1.04 |
| LAH Fuel Cartridge | 471 | 71.1 | 579 | 68.8 | 1214 | 0 |
| Case | 48 | 7.3 | 45 | 5.4 | 0 | 0 |
| Total | 662 | 100 | 841 | 100 | 1233 | 1.3 |

Figure 2:
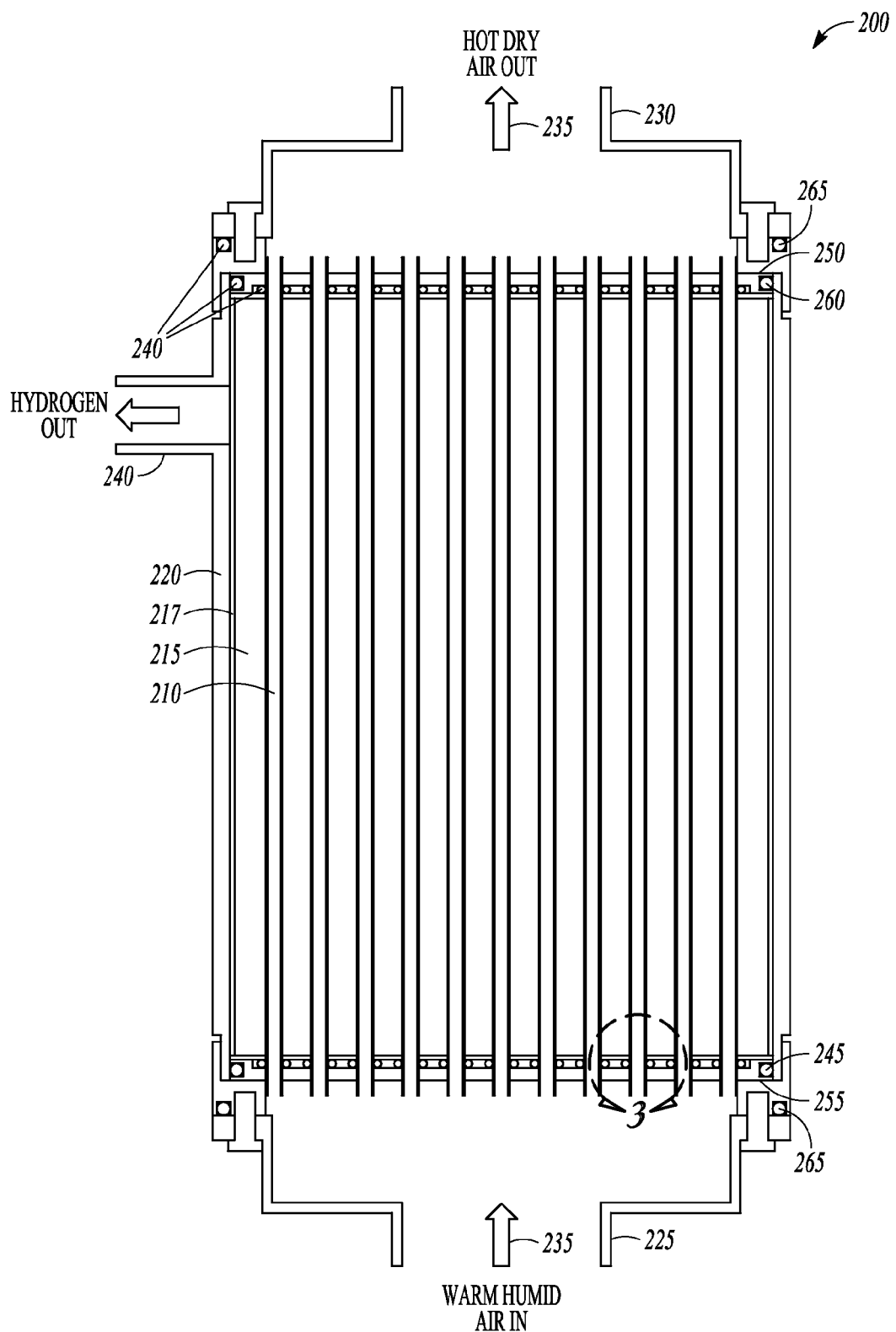
FIG. 2 is a block cross section diagram of a hydrogen generator according to an example embodiment.

FIG. 2 is a block cross section diagram of a hydrogen generator 200 according to an example embodiment. Hydrogen generator 200 in one embodiment is a high-rate hydrogen generator suitable for man-portable power and micro air vehicle applications that provides 4-5× the hydrogen of commercially available hydrogen sources of the same size and weight. Many different hydrogen producing fuels, such as LAH may be used. In further embodiments, the hydrogen producing fuel may include $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, alkali metal silicides, or any combinations thereof.

In one embodiment, the hydrogen generator 200 consists of a bundle of sulfonated tetrafluoroethylene (STFE) tubes 210 spaced substantially uniformly in a block of a porous and water-reactive fuel (chemical hydride) 215. In further embodiments, the tubes may be formed of a hydrogen permeable material, such as a polymer. Nafion® material may be used in one embodiment. The tubes may have wall shapes similar to those described above. Note that this embodiment is different from the fuel described above, where the fuel was disposed inside the tubes with water vapor passed on the outside of the tubes. In generator 200, the tubes 210 and fuel 215 are enclosed in a particulate filter 217 and further enclosed in a gas-impermeable container 220 with an inlet 225 and outlet 230 that provide a flow path indicated by arrows 235 for humidified air through the center of the STFE tubes 210, and a separate outlet 240 from the chemical hydride block of fuel 215 for hydrogen gas. The outlet 240 is sized to handle a maximum flow rate of hydrogen without creating substantial back pressure.

Water vapor from the air selectively permeates the STFE tubing 210 into the fuel block 215, while the other gases in air remain in the tubes 210 and are exhausted to ambient. The water vapor permeates the tubes 210 due to a large concentration gradient between the air and fuel sides of the tubes 210. In one embodiment, water in liquid form is to be avoided, as it may contain ions that would damage the tubing and prevent further water vapor permeation.

Once inside the fuel block 215, the water vapor reacts with the chemical hydride and generates hydrogen. The hydrogen diffuses throughout the fuel block 215 to outlet 240, where it may be fed to a PEM fuel cell as illustrated in FIG. 1 to generate electrical power. The tubes in one embodiment are substantially uniformly spaced to permit the water vapor to permeate the fuel as the hydrogen is released, such that substantially all of the hydrogen in the fuel is released over time. The STFE tubing 210 in one embodiment is a highly effective selectively permeable membrane that traps air on the inside, and keeps hydrogen on the outside and effectively only allows water vapor to pass through. The sizes of the inlet and outlet are formed to match or exceed the cross section of the tubes.

The hydrogen generator 200 interfaces with a fuel cell system, and may be contained in a replaceable and disposable (recyclable) cartridge such as container 220. These cartridges may provide a low-cost source of energy having a dramatic improvement in energy versus prior batteries and fuel cell systems in part, because the fuel cell system is retained, while only the cartridge is replaced. The hydrogen generator 200 may be cylindrical in geometry in one embodiment having an axis that is substantially parallel to the tubes.

Figure 3:
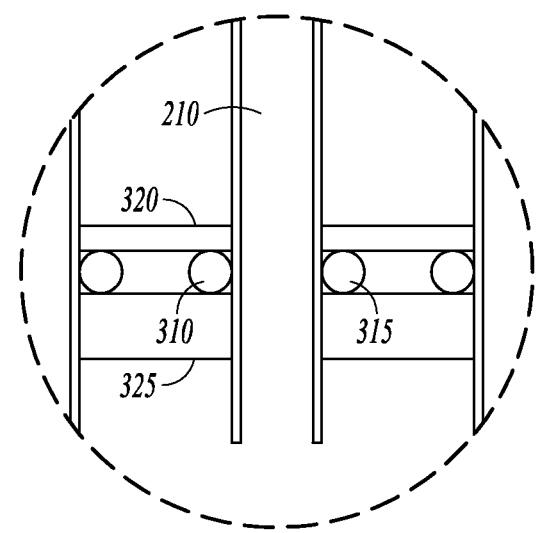
FIG. 3 is a block cross section diagram part of an end of the hydrogen generator of FIG. 2.

FIG. 3 is a block cross section diagram part of an end of the hydrogen generator of FIG. 2 providing further details of the assembly of the power generator 200. FIG. 3 illustrates in further detail that the STFE tubes 210 may be held in place and sealed at the top and bottom with o-rings 310, 315 and squeezed together by two plates 320, 325. Plates 320, 324 are formed with holes corresponding to the locations of the tubes and fit over the respective ends of the tubes. The perimeter of the plates are formed to mate with the inner perimeter of the container 220 and form a seal against corresponding ledges 245, 250 with the o-rings 255, 260 as illustrated in FIG. 2 and shown in further detail in FIG. 3.

The fuel block 215 may be formed utilizing a custom die having rods corresponding to the desired tube locations and inner dimensions corresponding to the dimensions of the container 220. A chemical hydride powder of a certain particle size is pressed in the die to a desired density with the cylindrical holes for the STFE tubes. A plate with holes corresponding to the tubes may be used to press the fuel into the die. A resulting porosity of the pressed fuel is about 20% in one embodiment, allowing hydrogen to flow freely through the block.

Figure 4:
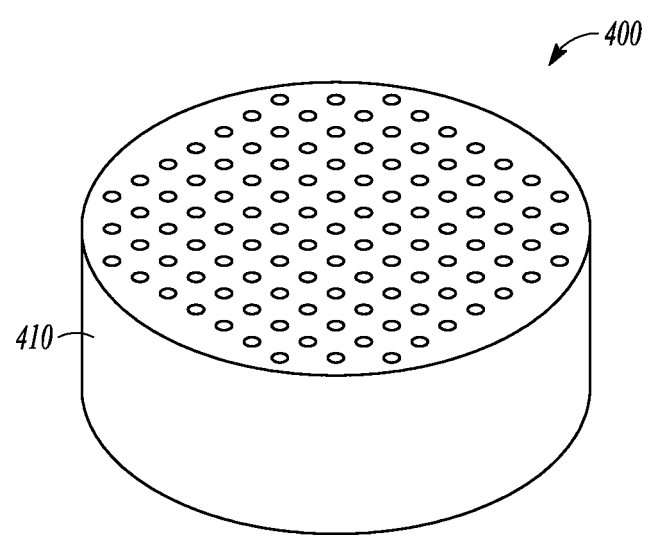
FIG. 4 is perspective view of a hydrogen fuel pellet formed in accordance with an example embodiment.

The resulting pressed fuel block 215, illustrated in FIG. 4 at 400 is placed in the container 220, and the STFE tubes 215 are inserted into the block 400 and secured at top and bottom with the o-rings and the plates. Caps with the inlet 225 and outlet 230 and also with o-ring seals 265 may be threaded onto the ends of the housing. Hydrogen is fed out of the hydrogen generator through port 240 in the side of container 220. A particulate filter 410 surrounds the fuel block and prevents particles from escaping from the port in the side. The particulate filter also provides a flow path from the perimeter of the pellet to the hydrogen port. In one embodiment, the filter also covers the ends of the fuel block, with openings for insertion of the tubes.

Figure 5A:
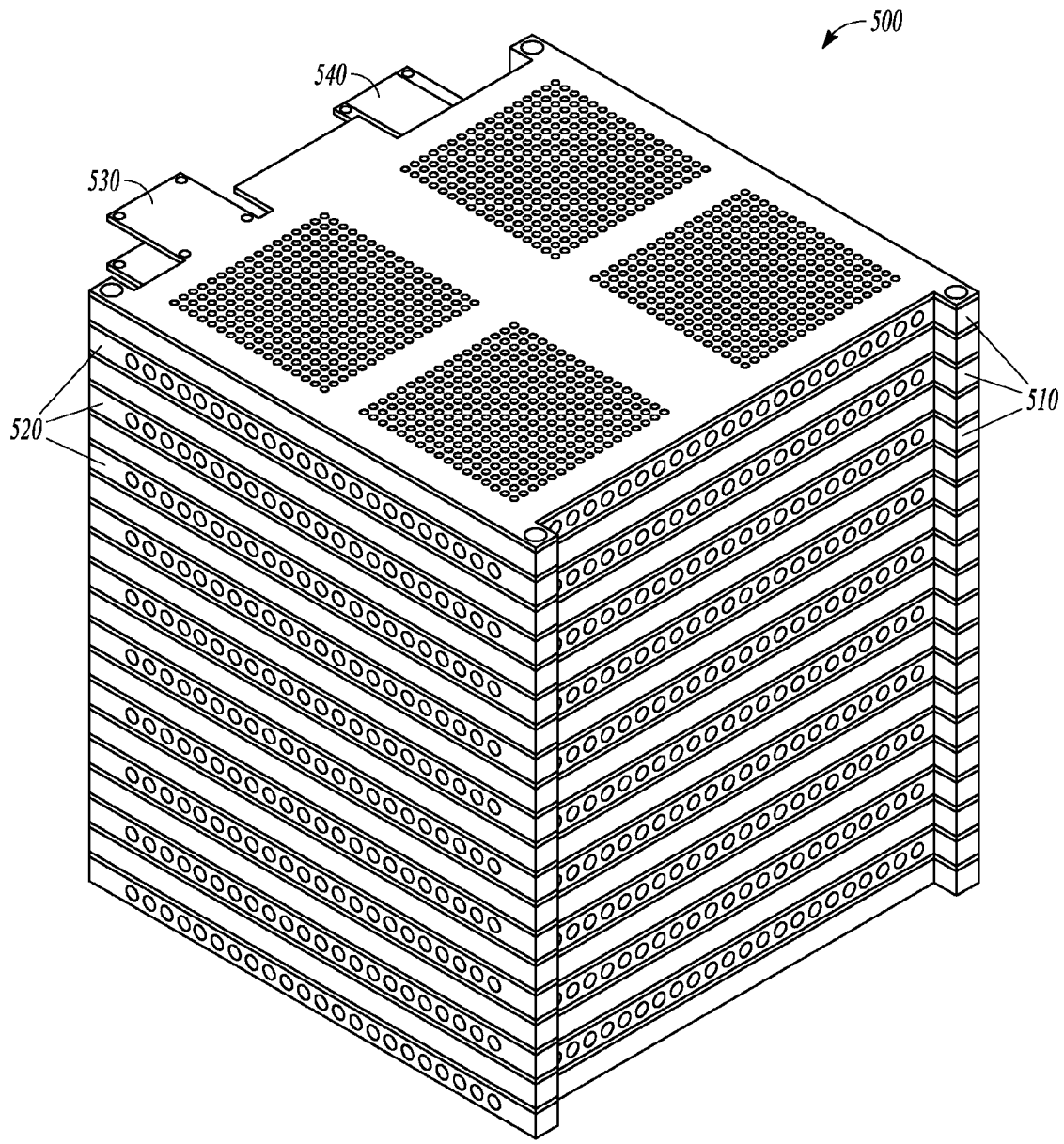
FIG. 5A is a block perspective diagram of a fuel cell stack according to an example embodiment.
Figure 5B:
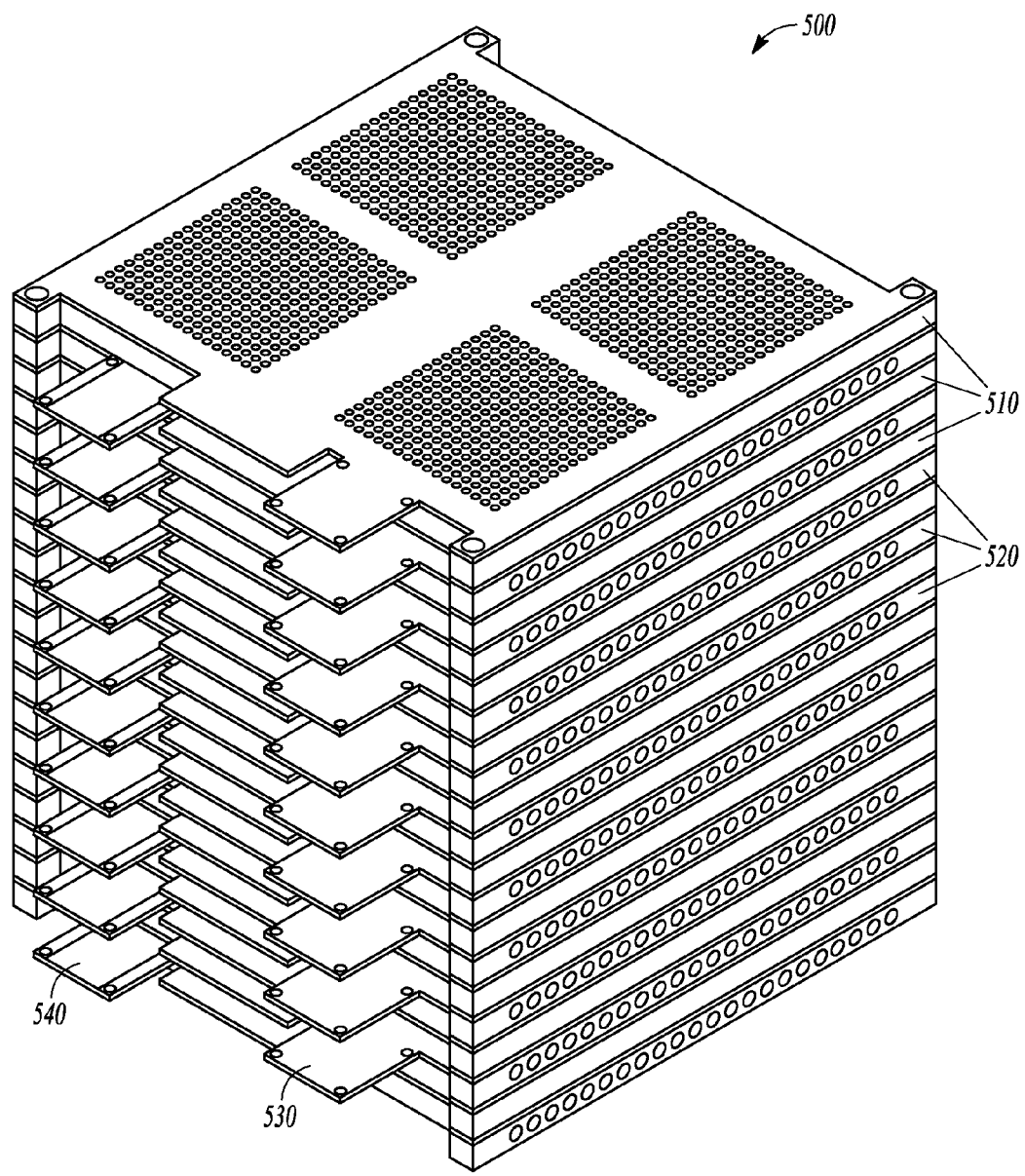
FIG. 5B is a block perspective diagram of the fuel cell stack of FIG. 5A, rotated to illustrate conductive tabs of electrode layers according to an example embodiment.

FIG. 5A is a block perspective diagram of a fuel cell stack 500 according to an example embodiment. FIG. 5B is a block perspective diagram of the fuel cell stack 500 of FIG. 5A, rotated to illustrate conductive tabs of electrode layers according to an example embodiment. Further diagrams are shown to illustrate details of various layers in the stack 500. The stack is formed with gas flow layers to facilitate flow of hydrogen and oxygen in air past fuel cell layers to facilitate the reaction producing electricity. In one embodiment, hydrogen flow layers are indicated at 510, and oxygen flow layers are indicated at 520. There are 10 layers of each, with fuel cell layers located between adjacent flow layers, resulting in 20 electricity producing fuel cell layers. In one embodiment, each layer has four fuel cells coupled in series to produce approximately 2.4 volts per layer under load. The layers are then selectively coupled in series via conductive tabs indicated at 530 and 540 to produce an output voltage of 48 volts under load in one embodiment. To make it easier to couple in series, alternate layers may be flipped, with negative tabs coupled to positive tabs and positive tabs coupled to negative tabs in an alternating manner down the stack. In further embodiments, the tabs may be coupled differently to provide different desired voltage and current levels, and more or fewer total layers may also be used. Still further, the number of cells per layer as well as the manner in which they are connected may be modified to provide further flexibility in providing a power generator with desired current-voltage characteristics.

In some embodiments, manifolds are provided on sides of the fuel cell stack to deliver oxygen and hydrogen to the corresponding layers. The outside of the fuel call stack may be encapsulated with a gas impermeable layer to ensure separation of the oxygen and hydrogen flow paths to and from the gas flow layers.

Figure 6:
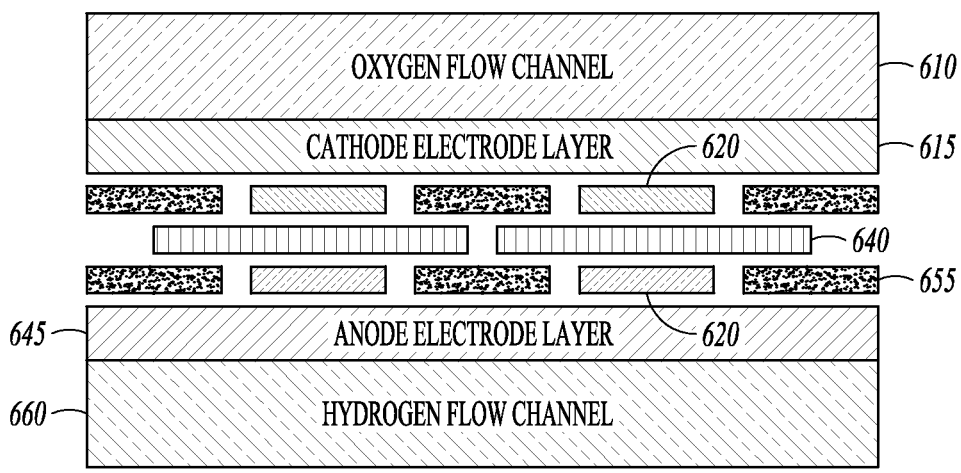
FIG. 6 is a block cross section diagram illustrating selected layers of the fuel cell stack of FIG. 5A.

FIG. 6 is a block cross section diagram illustrating selected layers of the fuel cell stack of FIG. 5A. Starting to the top of the selected layers and oxygen flow channel 610 is shown. A cathode electrode 615 is adjacent the flow channel 610, followed by a gas diffusion layer 620 adapted to correspond to each of the cells, with an adhesive layer 630. A membrane electrode assembly layer 640 is then disposed to receive oxygen from the flow channel 610, which is porous, and through the gas diffusion layer 630 on a first side. Hydrogen from a hydrogen flow channel 645 on the other side of the membrane electrode assembly layer 640 passes through an anode electrode layer 645, and gas diffusion layer 650 adhered between the membrane electrode assembly layer 640 and gas diffusion layer 650 by an adhesive layer 655. The hydrogen and oxygen react at the membrane electrode assembly layer 640 to produce electricity, which is conducted by the anode and cathode electrode layers. The layers between the flow channels are flipped and repeated between succeeding flow channels that alternate between hydrogen and oxygen flow channels.

Figure 7:
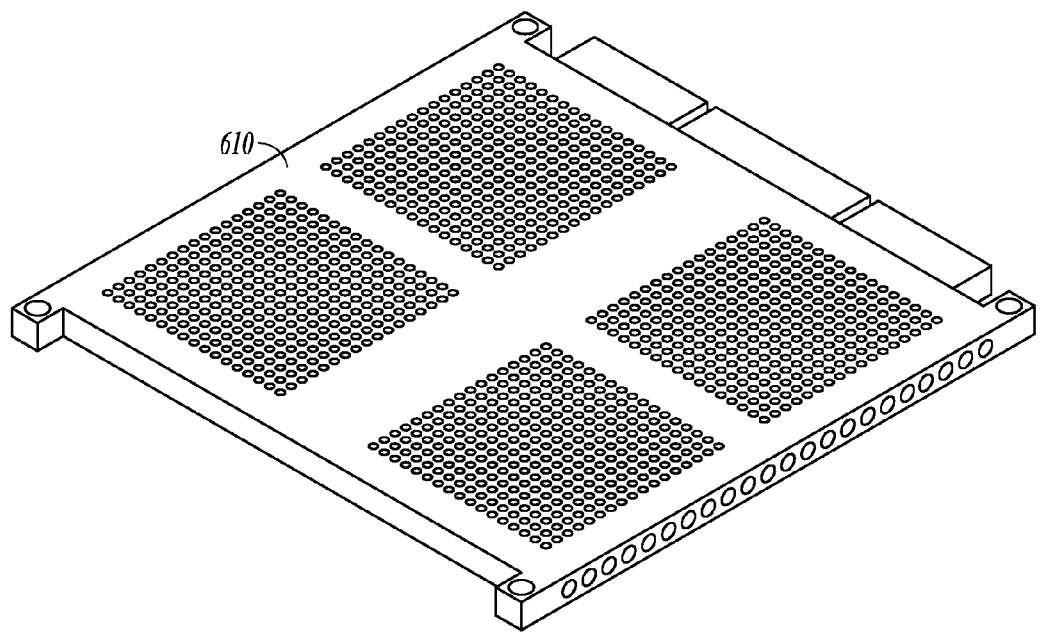
FIG. 7 is a perspective view of an oxygen flow channel for the fuel cell stack of FIG. 5A.

FIG. 7 is a perspective view of an oxygen flow channel layer 610 for the fuel cell stack of FIG. 5A. The oxygen flow channel 610 has a number of holes which may be parallel passages to facilitate the flow of oxygen contained in air. In one embodiment, the flow channel layer 610 is formed of carbon foam that is permeable to the flow of oxygen to facilitate flow of oxygen transfer to the layer to reach the membrane electrode assembly layer 640. In further embodiments different lightweight porous materials may be used that are compatible with oxygen.

Figure 8:
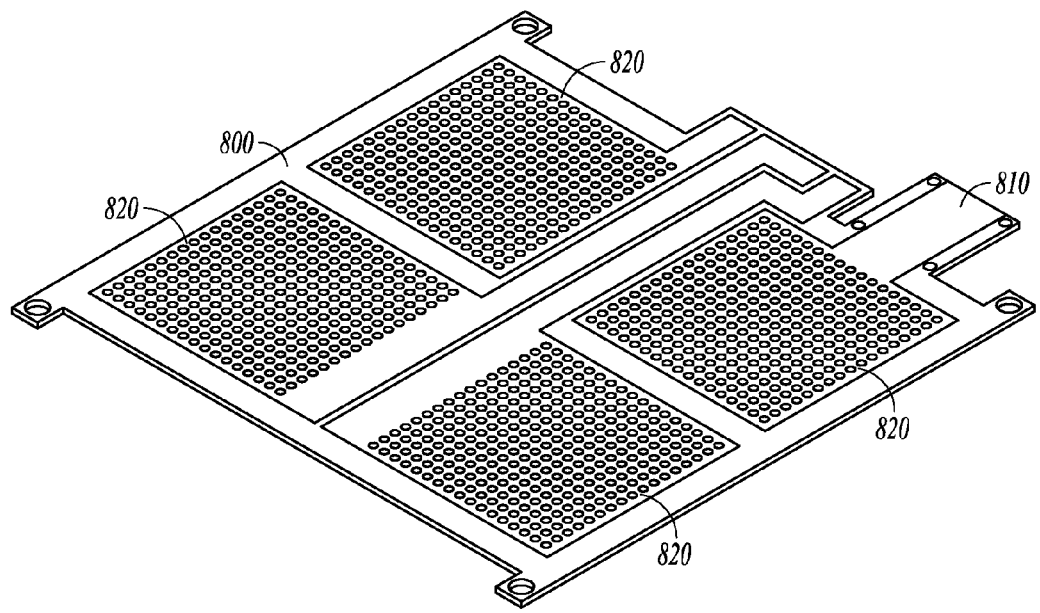
FIG. 8 is a perspective view of an electrode layer for the fuel cell stack of FIG. 5A.

FIG. 8 is a perspective view of an electrode layer 800 for the fuel cell stack of FIG. 5A. The layout may be the same for both anode and cathode electrode layers. An electrode tab 810 is coupled to electrode areas 820 corresponding to the membrane electrode assembly layer cell areas. The electrode areas may be coupled in series as described above, and may be formed of thin layer of gold or other conductor in various embodiments.

Figure 9:
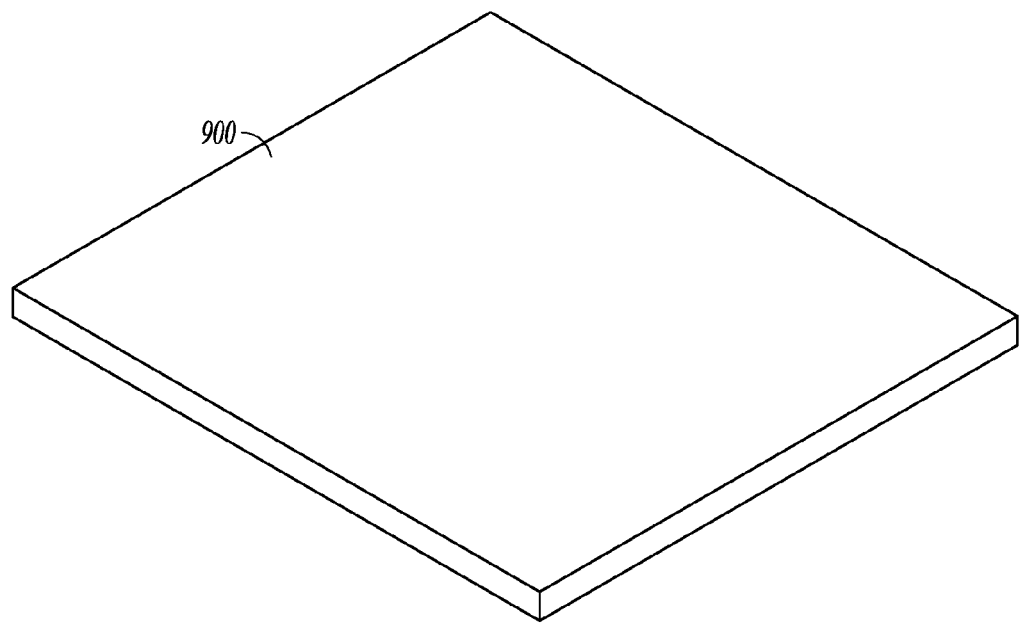
FIG. 9 is a perspective view of a gas diffusion layer for the fuel cell stack of FIG. 5A.

FIG. 9 is a perspective view of a gas diffusion layer 900 for the fuel cell stack of FIG. 5A. The gas diffusion layer may be same on both sides of the membrane electrode assembly layer 640 in one embodiment. The gas diffusion layer provides good permeability to gas and forms a low resistance electrical connection between the electrode and the MEA.

Figure 10:
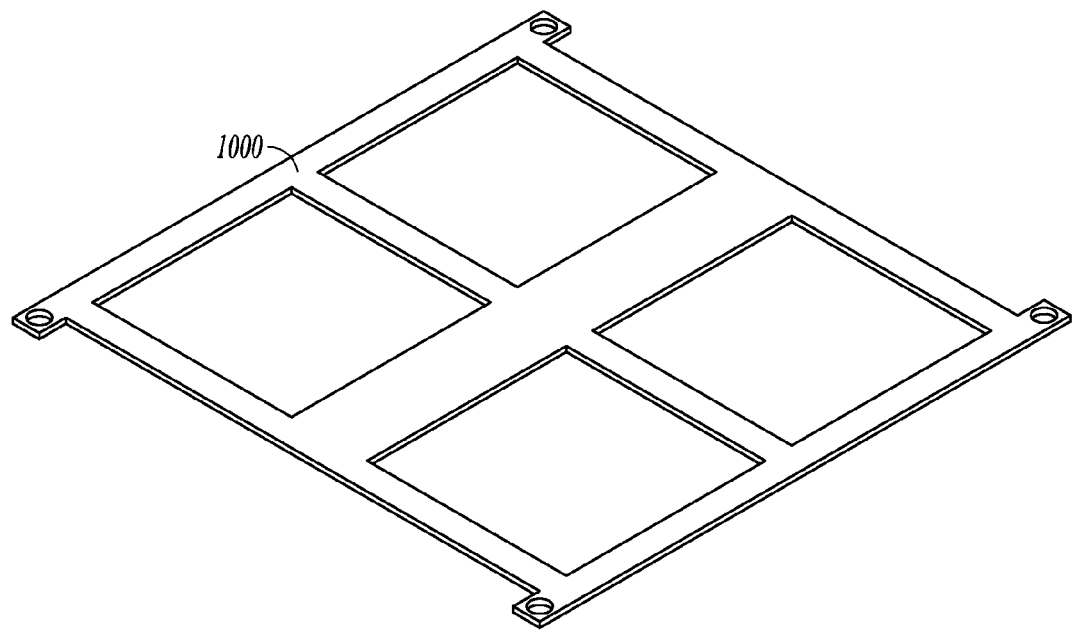
FIG. 10 is a perspective view of an adhesive layer for the fuel cell stack of FIG. 5A.

FIG. 10 is a perspective view of an adhesive layer 1000 for the fuel cell stack of FIG. 5A. The adhesive layer 1000 has opening corresponding to the cell areas in the membrane electrode assembly layer 640 to allow passage of the oxygen and hydrogen to the respective sides of the membrane electrode assembly layer 640.

Figure 11:
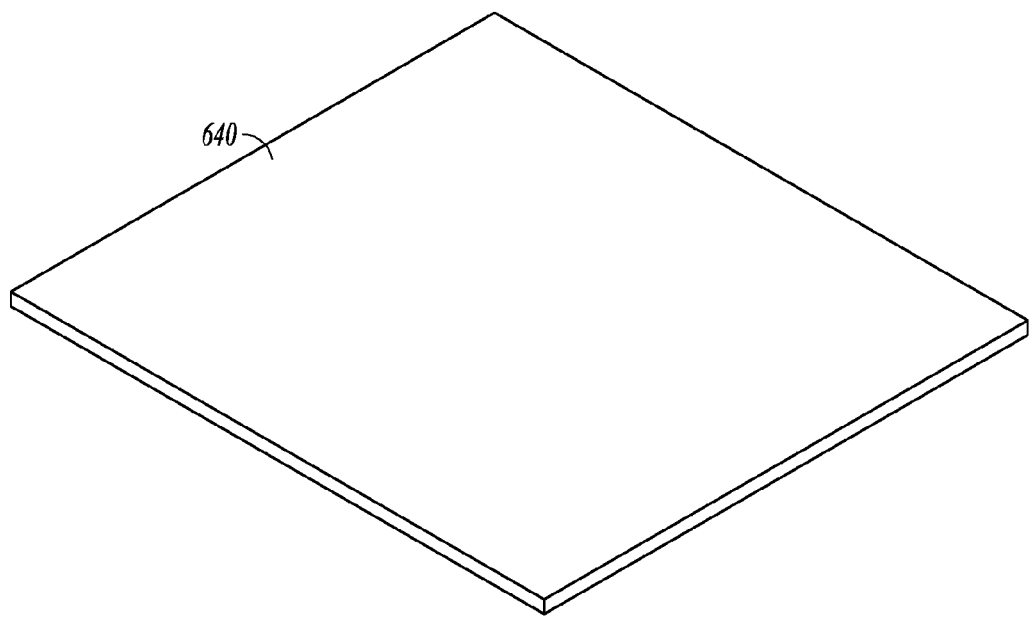
FIG. 11 is a perspective view of an MEA layer for the fuel cell stack of FIG. 5A.

FIG. 11 is a perspective view of a membrane electrode assembly layer 640 for the fuel cell stack of FIG. 5A. The cell areas are defined by the openings in the adhesive layers and the corresponding electrode areas.

Figure 12:
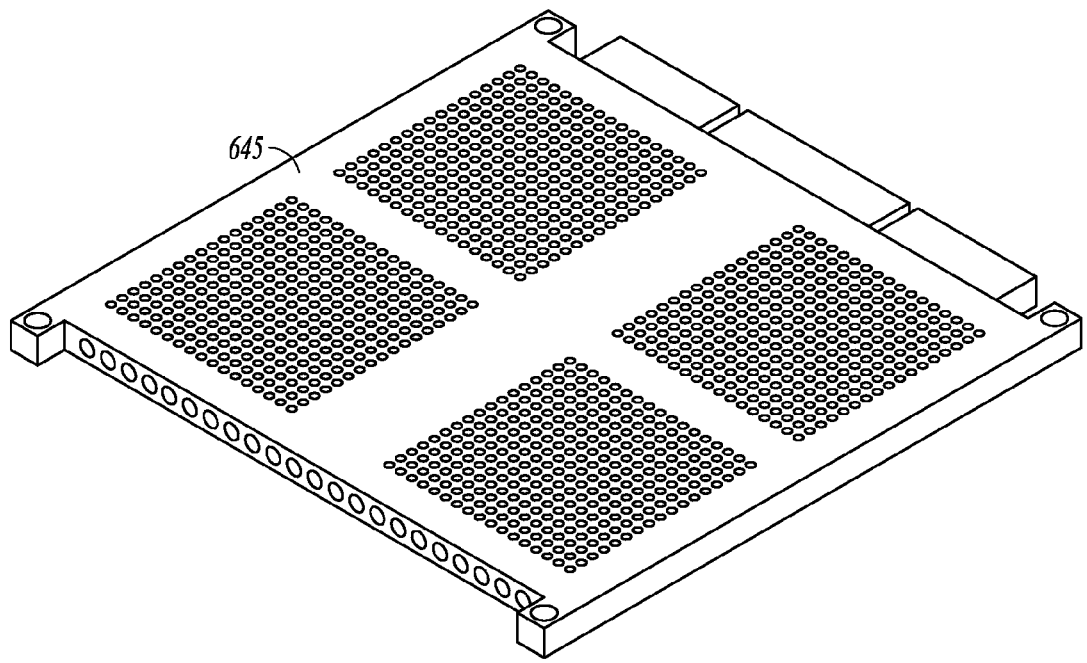
FIG. 12 is a perspective view of a hydrogen flow channel for the fuel cell stack of FIG. 5A.

FIG. 12 is a perspective view of a hydrogen flow channel 645 for the fuel cell stack of FIG. 5A. The hydrogen flow channel 645 has a number of holes which may be parallel passages to facilitate the flow of hydrogen contained in air. In one embodiment, the flow channel layer 645 is formed of carbon foam that is permeable to the flow of hydrogen to facilitate flow of hydrogen transfer to the layer to reach the membrane electrode assembly layer 640. In further embodiments different lightweight porous materials may be used that are compatible with hydrogen.

Figure 13:
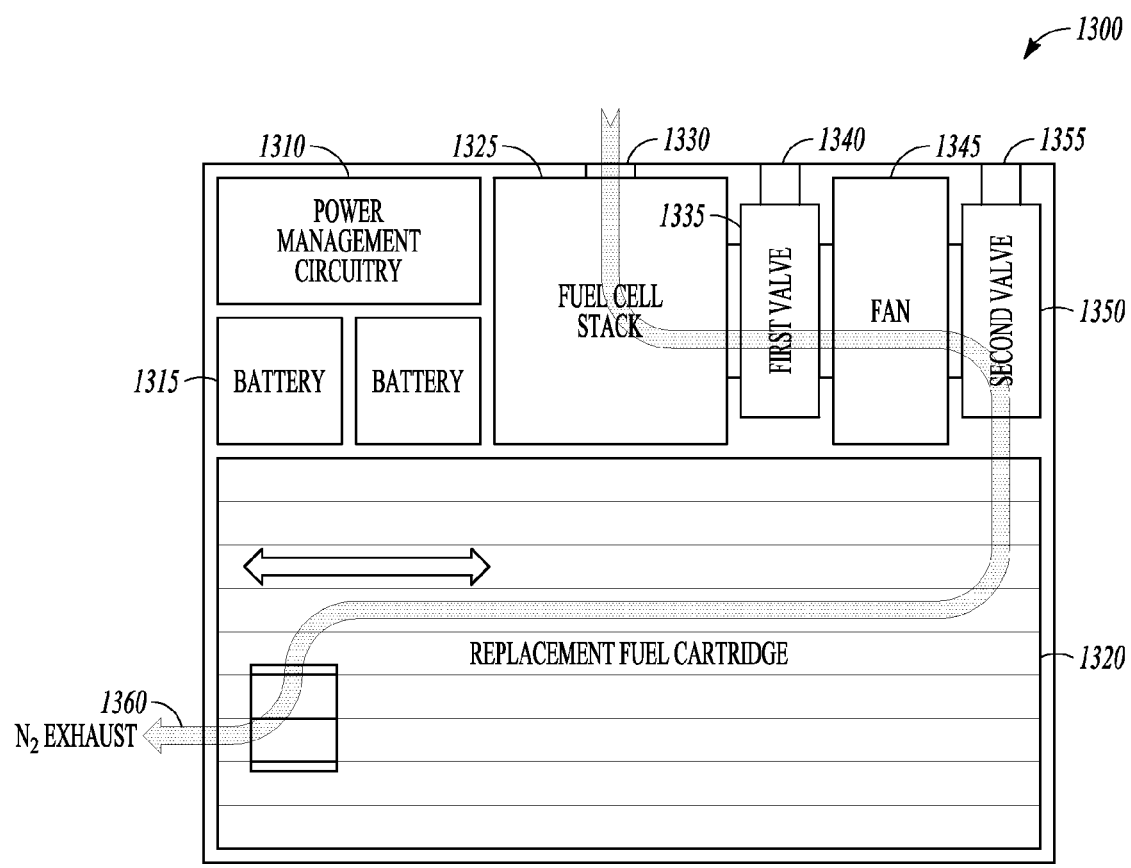
FIG. 13 is a cross section diagram of a hydrogen fuel cell based power generator according to an example embodiment.

FIG. 13 is a cross section diagram of a hydrogen fuel cell based power generator 1300 according to an example embodiment. This diagram illustrates an example layout for the power generator, illustrating component placement and airflow. Electrical connections are not shown for simplicity. Power management circuitry 1310 and batteries 1315 are shown in the upper left quadrant of the diagram, with a replaceable fuel cartridge 1320 shown in the bottom half of the generator 1300. The fuel cell stack 1325 is shown above the cartridge 1320 with an ambient air inlet indicated at 1330 coupled to the stack via a manifold that is not shown. The air inlet 1330 is the beginning of a flow path the provides oxygen to the fuel cell stack 1325 and then continues on through a first valve 1335 with air inlet 1340, a fan 1345, and a second valve 1350 with air outlet 1355. The flow path then continues on to the fuel cartridge 1320 and is exhausted at air outlet 1360. Not illustrated is a hydrogen outlet coupled via a manifold to the fuel cell stack 1325.

Figure 14:
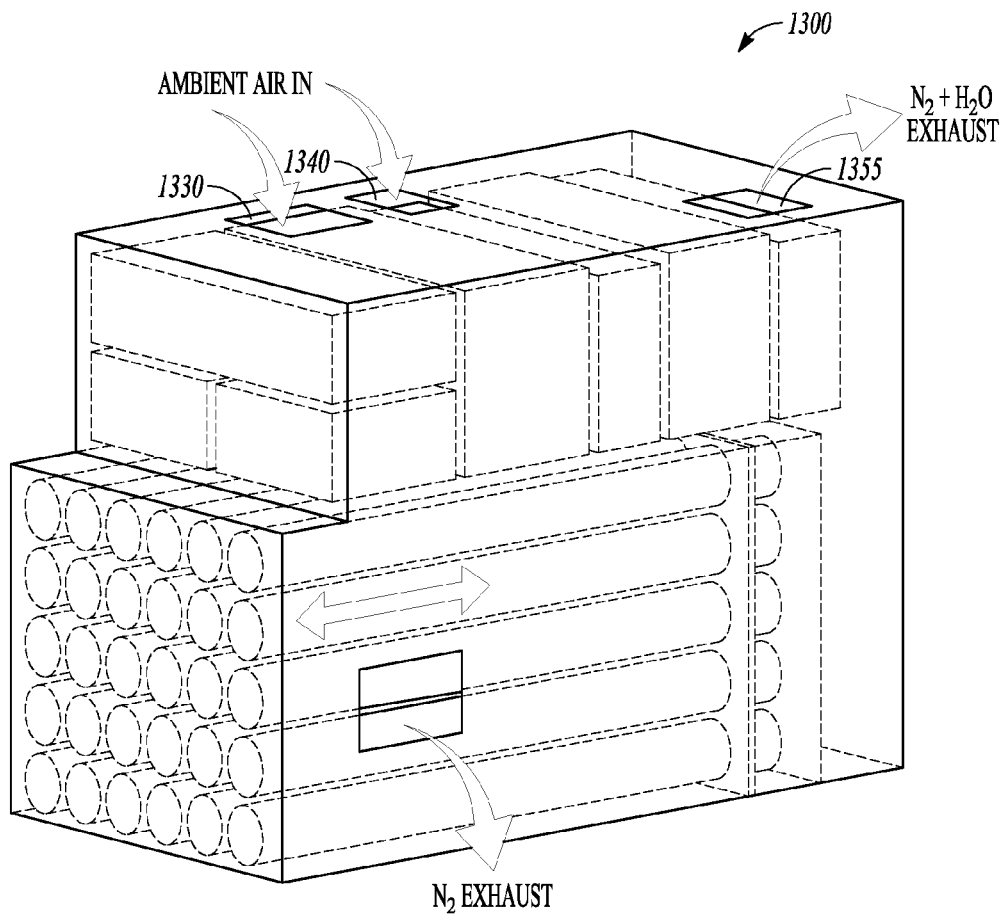
FIG. 14 is a perspective view of the generator of FIG. 13.

FIG. 14 is a perspective partially transparent view of the power generator 1300, showing fuel containing STFE tubes.

Figure 15:
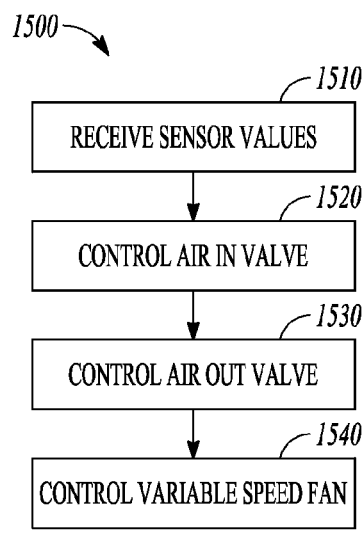
FIG. 15 is a flow diagram illustrating control of a hydrogen fuel cell based power generator according to an example embodiment.

FIG. 15 is a flow diagram 1500 illustrating control of a hydrogen fuel cell based power generator according to an example embodiment. In one embodiment, the power management and controller 115 executes functions to control both the humidity level of gas fed to the hydrogen generator and the temperature of the airflow as a function of the information obtained from the various sensors. In general, for each kilowatt of electricity generated by the fuel cell stack, 1 kilowatt of heat may be generated. Further, the generation of hydrogen also results in an additional 1 kilowatt of heat. The controller 115 is used to remove excess heat by controlling fans and valves. In further embodiments, the controller 115 also controls the fans and valves to ensure a desired amount of water vapor is provided to the hydrogen generator to satisfy demand.

Controller 115 may also control the fan and valves to regulate the amount of ambient air run past the fuel cell stack. By controller the amount of fluid flow in the air path via the control valve 175, more or less ambient air may be drawn in through inlet 140 and past the fuel cell stack. The amount of oxygen in the air drawn in is not a limiting factor in the performance of the fuel cell stack, so the effect of controlling the airflow is mainly maintaining a temperature and humidity of the fuel cell stack in a desired range.

At 1510, the controller 115 obtains data from numerous sensors regarding the temperature, humidity, and load. At 1520, the signals are generated to control valve 170 to control the amount of ambient air that can be added to the airflow. If the temperature of the fuel cell stack is high, more air can be drawn in through inlet 140 and used to cool the fuel cell stack. The fan speed can also be increased to help cool the fuel cell stack. At 1530, the controller 115 controls valve 180 to exhaust air from the flow path. Additional water vapor may be exhausted at this point to reduce the amount of water vapor received by the hydrogen generator. This may be done if the load is requiring less power, or if the water vapor content of flow in the path is otherwise too high. At 1540, the controller 115 controls the variable speed fan 130 as a function of the power demand and cooling requirements of the power generator. This process continues for as long as the system is operating.

During times of high demand, the power generator produces more hydrogen and uses more water vapor to do so. The power generator also generates more heat. The controller 115 thus increases the airflow by adding more ambient air to the flow path and increasing the speed of the fan. If the ambient humidity is too high, some of the airflow may be vented via valve 180. During periods of lower power demand, less heat is generated, and less airflow and water vapor are needed. In this case, the fan speed is decreased, and more water vapor may be vented via valve 180. Since water vapor is recycled in the system in addition to the ability to add further water vapor from ambient, higher amounts of hydrogen may be generated than in either closed systems with a water reservoir, or open systems the utilize only ambient water vapor from the humidity of the ambient air.

In further embodiments, different numbers of fans and valves may be used, such as two fans and one valve, or high numbers of both fans and valves. The combination of fan(s) and valve(s) is sufficient to facilitate independent control of airflow over the fuel cell stack and the amount of flow provided to the hydrogen generator. In one embodiment, the amount of airflow through the fuel cell stack may be optimized separately from the flow to the hydrogen generator.

Figure 16:
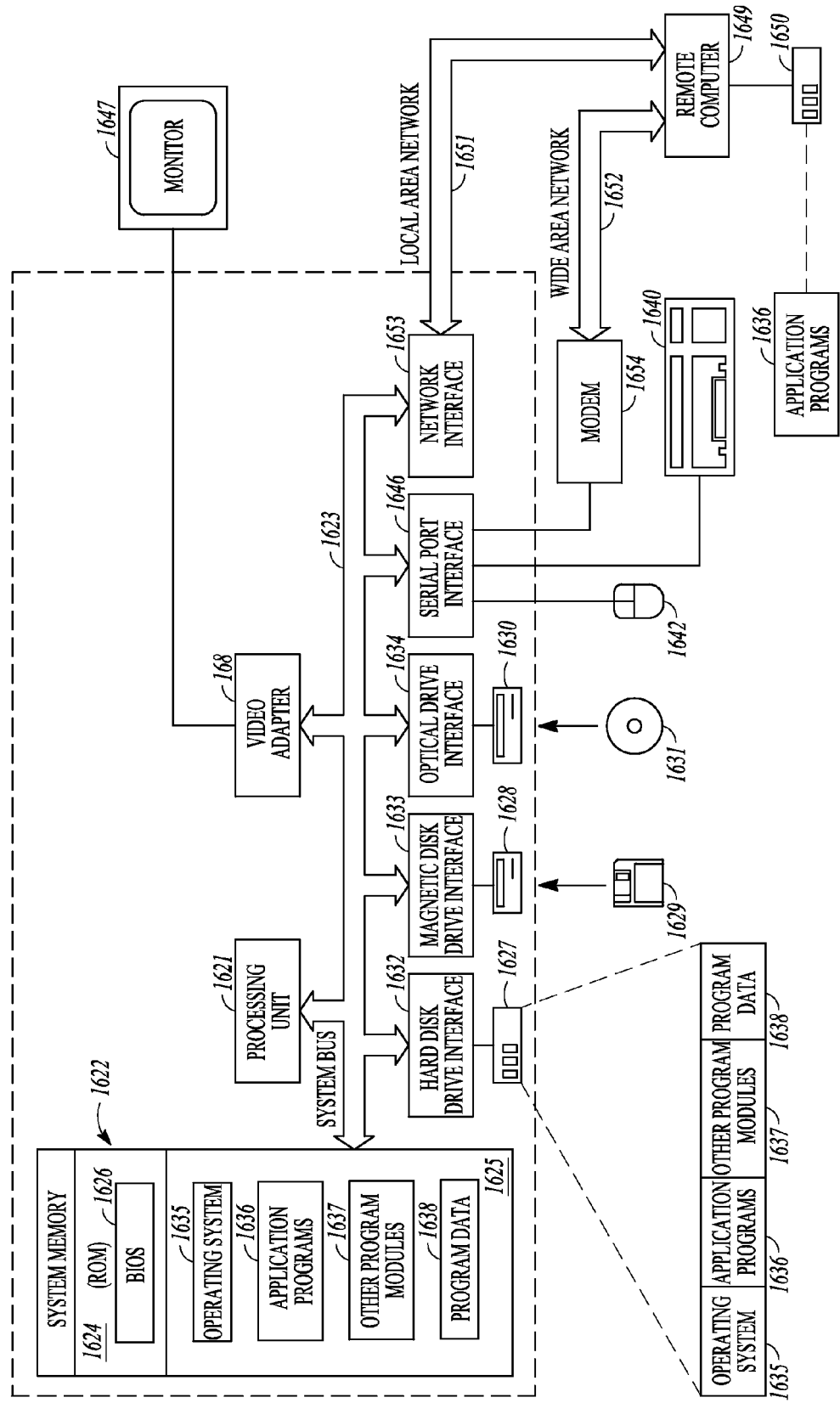
FIG. 16 is a block diagram of a specifically programmed system for executing control methods for a hydrogen fuel cell based power generator according to an example embodiment.

FIG. 16 is a block diagram of a specifically programmed system for executing control methods for a hydrogen fuel cell based power generator according to an example embodiment. One embodiment of hardware and operating environment of the system includes a general purpose computing device in the form of a computer 1600 (e.g., a personal computer, workstation, or server), including one or more processing units 1621, a system memory 1622, and a system bus 1623 that operatively couples various system components including the system memory 1622 to the processing unit 1621. There may be only one or there may be more than one processing unit 1621, such that the processor of computer 1600 comprises a single central-processing unit (CPU), or a plurality of processing units, commonly referred to as a multiprocessor or parallel-processor environment. In various embodiments, computer 1600 is a conventional computer, a distributed computer, or any other type of computer.

The system bus 1623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 1624 and random-access memory (RAM) 1625. A basic input/output system (BIOS) program 1626, containing the basic routines that help to transfer information between elements within the computer 1600, such as during start-up, may be stored in ROM 1624. The computer 1600 further includes a hard disk drive 1627 for reading from and writing to a hard disk, not shown, a magnetic disk drive 1628 for reading from or writing to a removable magnetic disk 1629, and an optical disk drive 1630 for reading from or writing to a removable optical disk 1631 such as a CD ROM or other optical media.

The hard disk drive 1627, magnetic disk drive 1628, and optical disk drive 1630 couple with a hard disk drive interface 1632, a magnetic disk drive interface 1633, and an optical disk drive interface 1634, respectively. The drives and their associated computer-readable media provide non volatile storage of computer-readable instructions, data structures, program modules and other data for the computer 1600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 1629, optical disk 1631, ROM 1624, or RAM 1625, including an operating system 1635, one or more application programs 1636, other program modules 1637, and program data 1638. Programming for implementing one or more processes or method described herein may be resident on any one or number of these computer-readable media.

A user may enter commands and information into computer 1600 through input devices such as a keyboard 1640 and pointing device 1642. Other input devices (not shown) can include a microphone, joystick, game pad, satellite dish, scanner, or the like. These other input devices are often connected to the processing unit 1621 through a serial port interface 1646 that is coupled to the system bus 1623, but can be connected by other interfaces, such as a parallel port, game port, or a universal serial bus (USB). A monitor 1647 or other type of display device can also be connected to the system bus 1623 via an interface, such as a video adapter 1648. The monitor 1647 can display a graphical user interface for the user. In addition to the monitor 1647, computers typically include other peripheral output devices (not shown), such as speakers and printers.

The computer 1600 may operate in a networked environment using logical connections to one or more remote computers or servers, such as remote computer 1649. These logical connections are achieved by a communication device coupled to or a part of the computer 1600; the invention is not limited to a particular type of communications device. The remote computer 1649 can be another computer, a server, a router, a network PC, a client, a peer device or other common network node, and typically includes many or all of the elements described above 110 relative to the computer 1600, although only a memory storage device 1650 has been illustrated. The logical connections depicted in FIG. 16 include a local area network (LAN) 1651 and/or a wide area network (WAN) 1652. Such networking environments are commonplace in office networks, enterprise-wide computer networks, intranets and the internet, which are all types of networks. When used in a LAN-networking environment, the computer 1600 is connected to the LAN 1651 through a network interface or adapter 1653, which is one type of communications device. In some embodiments, when used in a WAN-networking environment, the computer 1600 typically includes a modem 1654 (another type of communications device) or any other type of communications device, e.g., a wireless transceiver, for establishing communications over the wide-area network 1652, such as the internet. The modem 1654, which may be internal or external, is connected to the system bus 1623 via the serial port interface 1646. In a networked environment, program modules depicted relative to the computer 1600 can be stored in the remote memory storage device 1650 of remote computer, or server 1649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) is submitted with the understanding that it will not be used to interpret or limit the scope or meaning of the claims.

The invention claimed is:

1. A device comprising:
    a chemical hydride fuel pellet having a plurality of holes extending from a first end to a second end, wherein the fuel pellet is surrounded by a particulate filter;
    a plurality of tubes formed of water vapor permeable and hydrogen impermeable material extending from the first end to the second end through the holes;
    a container having an inlet for water vapor containing gas coupled to the first end of the tubes and an outlet coupled to the second end of the tubes; and
    a hydrogen outlet coupled to the fuel pellet.

2. The device of claim 1 wherein the fuel pellet is porous to hydrogen.

3. The device of claim 1 wherein the tubes comprise sulfonated tetrafluoroethylene (STFE).

4. The device of claim 1 wherein the pellet includes a membrane to prevent hydrogen from escaping from the container except through the hydrogen outlet.

5. The device of claim 1 wherein the pellet is formed of a pressed lithium aluminum hydride powder.

6. The device of claim 1 wherein the pellet includes at least one chemical hydride selected from the group consisting of $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, and alkali metal silicides.

7. The device of claim 1 wherein the tubes are substantially uniformly distributed throughout the fuel pellet.

8. The device of claim 1 wherein the container is formed of light weight plastic that is hydrogen impermeable.

9. The device of claim 8 and further comprising plates sealed against the inlet and outlet of the container to contain the fuel, the plates having openings sealed against the corresponding ends of the tubes.

10. The device of claim 9 wherein the plates comprise pairs of plates compressing an o-ring between them around each end of the tubes.

11. The device of claim 1 wherein the size of the inlet and outlet are adapted to be at least as large in area as a combined area of the tubes.

12. The device of claim 1 wherein the fuel pellet is cylindrical in shape having an axis that is substantially parallel to the tubes.

13. A device comprising:
  a hydrogen generating fuel pellet having a plurality of holes extending from a first end to a second end, wherein the fuel pellet is surrounded by a particulate filter;
  a plurality of tubes formed of water vapor permeable and hydrogen impermeable material extending from the first end to the second end through the holes to provide water vapor containing airflow through the fuel pellet;
  a container surrounding the fuel pellet and tubes and having an inlet for water vapor containing gas coupled to the first end of the tubes and an outlet coupled to the second end of the tubes; and
  a hydrogen outlet coupled to the fuel pellet.

14. The device of claim 13 wherein the fuel pellet is porous to hydrogen, and wherein the tubes comprise sulfonated tetrafluoroethylene (STFE).

15. The device of claim 14 wherein the pellet includes a membrane to prevent hydrogen from escaping from the container except through the hydrogen outlet.

16. The device of claim 15 wherein the pellet is formed of a pressed lithium aluminum hydride powder.

17. he device of claim 16 wherein the tubes are substantially uniformly distributed throughout the fuel pellet to both uniformly distribute water vapor to the fuel and to remove heat from the fuel.

18. The device of claim 16 and further comprising plates sealed against the inlet and outlet of the container to contain the fuel, the plates having openings sealed against the corresponding ends of the tubes.

19. The device of claim 13 wherein the pellet includes at least one chemical hydride selected from the group consisting of $LiAlH_4$, $NaAlH_4$, $KAlH_4$, $MgAlH_4$, $CaH_2$, $LiBH_4$, $NaBH_4$, $LiH$, $MgH_2$, $Li_3Al_2$, $CaAl_2H_8$, $Mg_2Al_3$, alkali metals, alkaline earth metals, and alkali metal silicides.

20. A method comprising:
  flowing humid air through a plurality of tubes formed of water vapor permeable and hydrogen impermeable material extending from a first end to a second end of the tubes;
  permeating the water vapor through walls of the tubes into a chemical hydride fuel pellet through which the tubes extend, the chemical hydride fuel pellet surrounded by a particulate filter; and
  producing hydrogen via a reaction of fuel with the water vapor and exhausting the hydrogen through a hydrogen outlet.

21. The method of claim 20 wherein the fuel pellet is formed by:
  placing a chemical hydride powder in a fixture with rods;
  pressing the powder into the fixture to form the pellet;
  removing the resulting pellet and inserting it into a hydrogen impermeable container; and
  inserting the tubes through holes in the pellet corresponding to the rods.

* * * * *